United States Patent [19]

Ishii et al.

[11] Patent Number: 5,375,104
[45] Date of Patent: Dec. 20, 1994

[54] MOBILE TERMINAL EQUIPMENT

[75] Inventors: Junichi Ishii; Takanari Matsukawa, both of Tokyo, Japan

[73] Assignee: NEC Corporation, Tokyo, Japan

[21] Appl. No.: 36,835

[22] Filed: Mar. 25, 1993

[30] Foreign Application Priority Data

Mar. 26, 1992 [JP] Japan ................................. 4-067799
Apr. 20, 1992 [JP] Japan ................................. 4-099054

[51] Int. Cl.⁵ ........................ H04Q 7/00; G04G 9/00
[52] U.S. Cl. ...................................... 368/22; 368/47
[58] Field of Search ............................. 368/22, 47, 55

[56] References Cited

U.S. PATENT DOCUMENTS 4,313,186 1/1982 Yoshida ................................ 368/22
4,644,347 2/1989 Lucas et al. .......................... 368/43

FOREIGN PATENT DOCUMENTS

0475298 3/1992 European Pat. Off. .
258937 2/1990 Japan .
90113983 11/1990 WIPO .

Primary Examiner—Bernard Roskoski
Attorney, Agent, or Firm—Sughrue, Mion, Zinn, Macpeak & Seas

[57] ABSTRACT

A mobile terminal equipment automatically displaying the local time in any desired geographical area for use in mobile telephone systems and the like. One example of this mobile terminal equipment is a mobile telephone set capable of displaying the local time wherever it is used by calculating the time difference from the home town on the basis of location registration area information supplied from the base station. Another example of this mobile terminal equipment is an IC card-inserting type mobile telephone set capable of displaying the home town time by calculating the time difference between the home town and its area of use on the basis of home town information stored in the IC card.

4 Claims, 6 Drawing Sheets

MOBILE TERMINAL EQUIPMENT

BACKGROUND OF THE INVENTION

1. Field of the Invention

The present invention relates to mobile terminal equipment having a time displaying function, and more particularly to mobile terminal equipment suitable for mobile telephones, for instance, to be used in a plurality of geographical areas differing in standard time.

2. Description of the Related Art

When mobile terminal equipment of this kind is to be used in any area belonging to a standard time zone different from that of its home memory station, it is desirable for the time display of the equipment to be automatically adjusted to the standard time of its use. For mobile terminal equipment of the IC card-inserting type, it would be more convenient for contact with the main area of the use (home town) of the IC card to have the standard time of the home town displayed rather than that of the area in which the mobile terminal equipment is used.

Mobile terminal equipment with a function to automatically calibrate the displayed time is disclosed for use in multi-channel access (MCA) systems in a Japanese patent disclosure gazette (patent application disclosure No. 1990-58937; disclosed on Feb. 28, 1990; the invention entitled a mobile communication system). This mobile terminal equipment receives reference time data from the radio base station, and calibrates its own time in accordance with the reference time data. However, if time data are added to data information, the need to process the time data will inevitably enlarge the circuitry of the mobile terminal in dimensions. This is undesirable for mobile telephone systems or other systems which require mobile terminal units to be simplified in configuration.

SUMMARY OF THE INVENTION

Objects of the Invention

A first object of the present invention is to provide a mobile terminal equipment which is capable, even if moved to a geographical area differing in standard time, of automatically displaying the time of the area in which it is used, and moreover is simple in configuration.

A second object of the invention is to provide a mobile terminal equipment of the IC card-inserting type, capable of automatically displaying the standard time of its home town irrespective of the area in which the mobile terminal equipment is currently used.

Summary of the Invention

In mobile terminal equipment according to the present invention, a locational information generating circuit generates locational information indicating which of a plurality of standard time zones is to be selected for display. A time difference calculating circuit, ready in advance with time difference information concerning the standard times of the plurality of areas obtained from said locational information, calculates the time difference between the standard time corresponding to said locational information and a separately preset one of said standard times. A clock circuit generates time data counted according to one of said standard times. A time data correcting circuit is responsive to said time difference for correcting said time data into the time data of the standard time of the area corresponding to said locational information. A time display displays the time corresponding to the corrected time data.

One of the aspects in which this mobile terminal equipment is to be put into practical use is mobile telephones of the cellular type. Such a mobile telephone generates aid locational information in response to a radio signal from the radio base station. This locational information may be a zone identification code signal indicating the current location registration area of this mobile telephone.

Another aspect in which the mobile terminal equipment would find practical use is cellular mobile telephones of the IC card-inserting type. In the IC card is stored the home town information of the person moving from one geographical area to another. Such a mobile telephone uses the home town as the locational information, and reads out the home town information into the time difference calculating circuit. Therefore, this mobile telephone displays the standard time of this home town on its time display.

Still another aspect in which the mobile terminal equipment could be put into practical use is mobile telephones of the IC card-inserting type. Such a mobile telephone stores the area in which the telephone is currently used into a locational information storage as locational information. Meanwhile, in the IC card are stored in advance the standard time of said home town, which is predetermined, and the differences from the standard times of a plurality of areas of use including the area of current use. An IC card interface circuit reads out the time difference between the area of use and the home town from the IC card into time data correcting circuit, which corrects the current time data into the time data of the home town in response to the time difference. Accordingly the time display displays the standard time of the home town.

BRIEF DESCRIPTION OF THE DRAWINGS

The above-mentioned and other objects, features and advantages of the present invention will become more apparent from the following detailed description when taken in conjunction with the accompanying drawings, wherein:

FIG. 5 is a flow chart for describing another of the time displaying operations in the mobile telephone set 7B.

DETAILED DESCRIPTION OF THE PREFERRED EMBODIMENTS

Figure 1:
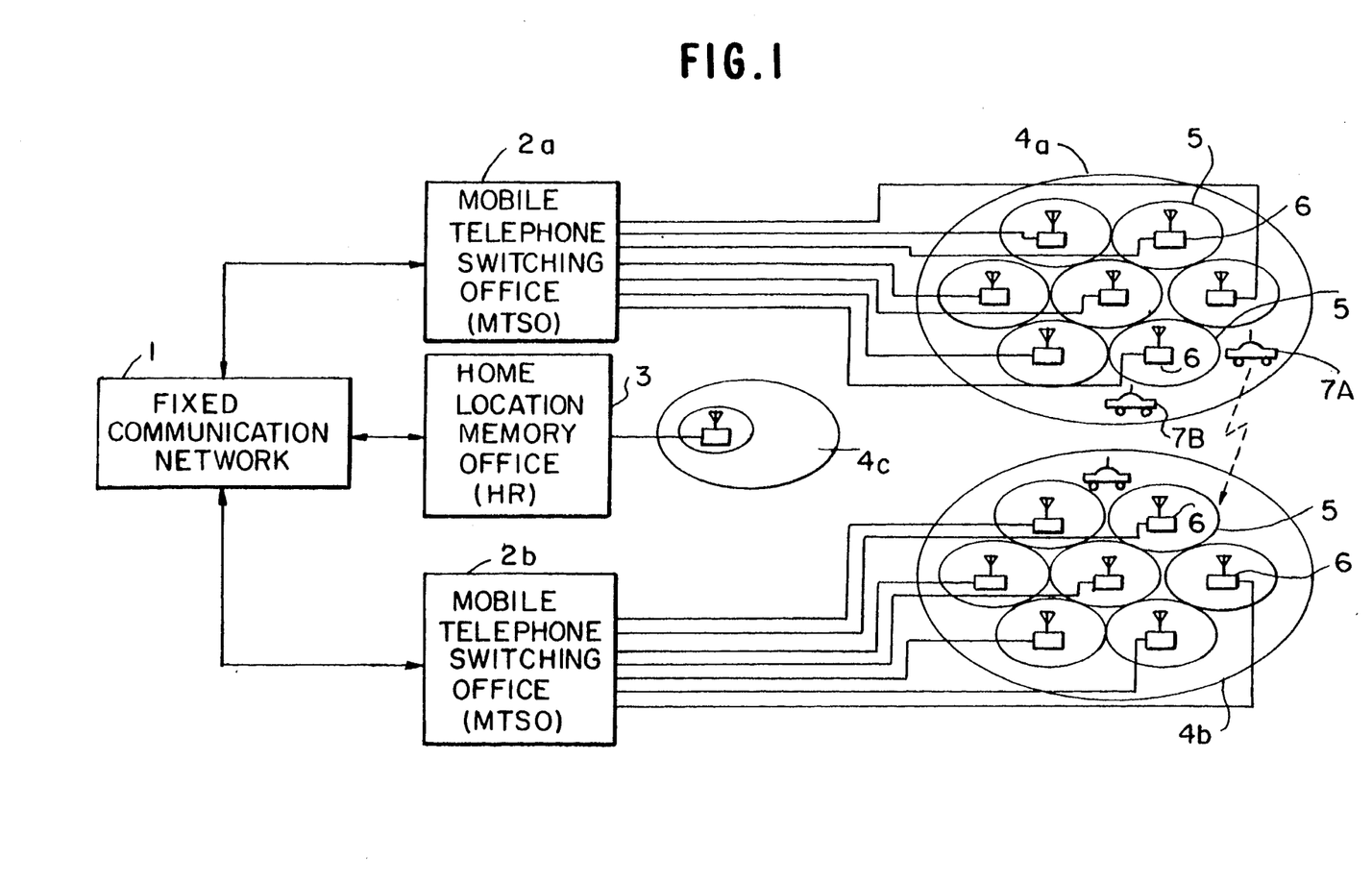
FIG. 1 illustrates a mobile telephone system to which a preferred embodiment of the invention is applicable.

Referring to FIG. 1, this cellular mobile telephone system connects mobile telephone switching offices (MTSO's) 2a and 2b, differing from each other in standard time, via a fixed communication network 1. The MTSO 2a has a location registration area 4a, consisting of a plurality of cells 5, as its service area, and is connected to each of base stations (BS's) 6, one of which is installed in each of the cells 5. The MTSO 2b has a location registration area 4b, also consisting of a plurality of cells 5, as its service area, and is connected to each of base stations (BS's) 6, each corresponding to one or another of the cells 5. This mobile telephone system further connects to the fixed communication network 1 the location registration area 4c of a home location memory office (HR) 3, which is an MTSO, and many other location registration areas not shown herein. These many location registration areas may have the same standard time or different standard times. Here, the mobile telephone set (MS) 7A has the location registration area 4c as its home town and the HR 3 as its home location memory office.

Figure 2:
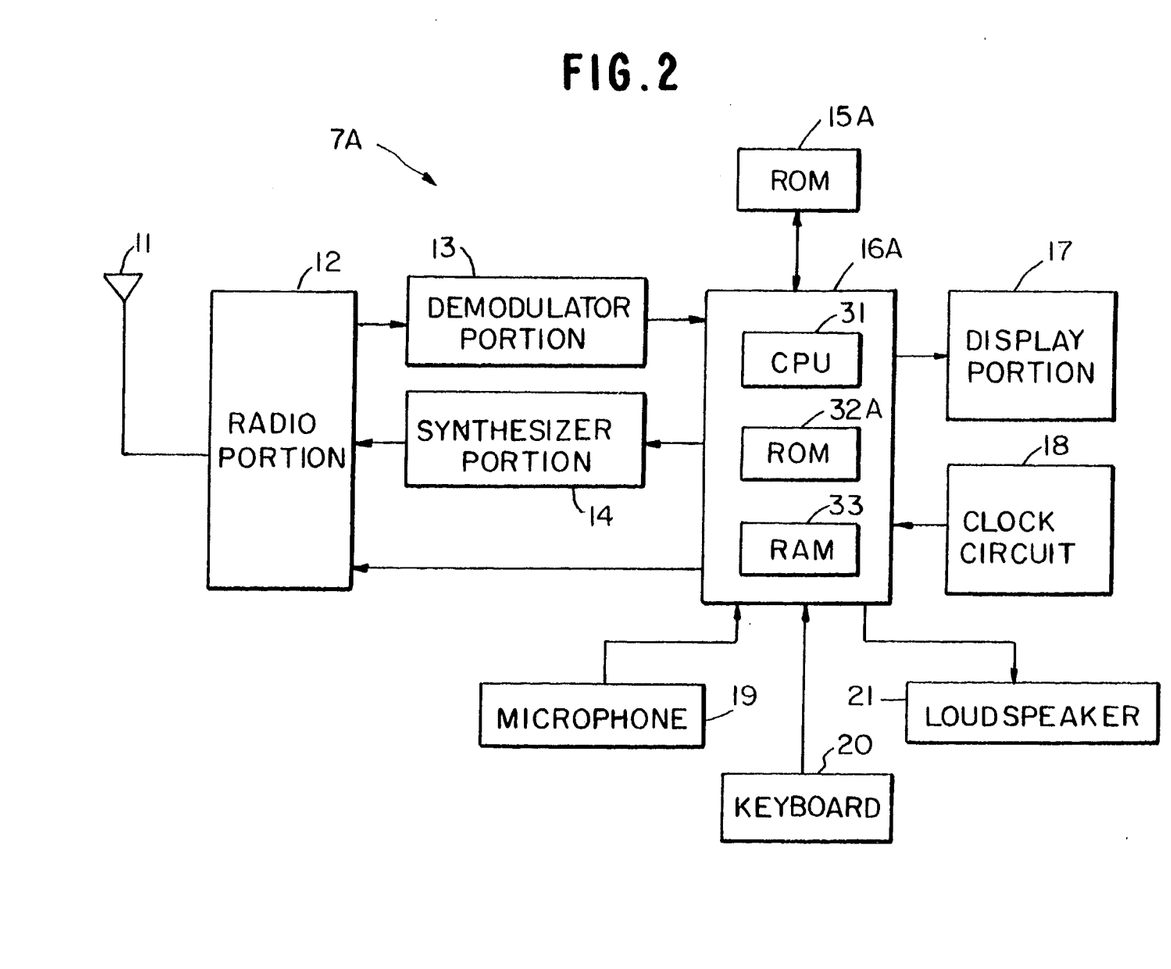
FIG. 2 is a block diagram of the preferred embodiment of the invention.

Referring to FIG. 2 together, the mobile telephone set 7A performs communication with another mobile telephone set and the fixed communication network 1 via one of the BS's 6. Thus, the antenna 11 of the MS 7A receives radio signals, including the area identification signal of the location registration area 4a, from the BS 6. Such an area identification signal is assigned in advance to each location registration area. The received radio signals from the antenna 11 are converted by a radio portion 12 into intermediate frequency (IF) signals. In response to these IF signals, a microprocessor (CPU) 31 and a control portion 16A, including a ROM 32A for storing a program to operate the CPU 31 and a RAM 33 for use in arithmetic operation, supply speech signals to a microphone 19, and reproduce said area identification signal in a digital form. The control portion 16A, in response to data from a keyboard 20 and speech signals from a loudspeaker 21, sends transmit signals to the radio portion 12, which converts these transmit signals into transmit radio signals and transmits them from the antenna to the BS 6. The line connection and other procedures between the BS 6 and the MS 7A are executed in accordance with methods known to persons skilled in the art. A frequency synthesizer portion 14, under control by the control portion 16A, performs channel switching between the MS 7A and the BS 6.

The clock circuit 18 of the MS 7A generates time data counted according to the standard time of the location registration area 4c, which is stored in a ROM 15A as the home town in the form of an area code signal. The ROM 15A are also ready in advance with time difference data indicating the differences between standard times, each corresponding to one or another of said area identification signals which can exist in the coverage of this mobile telephone system, and the standard time of the area 4c. The control portion 16A, upon receiving an area identification signal from the BS 6 in the location registration area 4b, reads out said time difference data as the address signal of the ROM 15A, and adds said time difference data to the time data counted by the clock circuit 18. Then, the control portion 16A transmits the time data corrected with said time difference data, i.e. the time data of the standard time corresponding to the reproduced area identification signal, and a display portion 17 displays the time according to the standard time of the location registration area 4a.

The mobile telephone set 7A, when it moves from the location registration area 4a to the area 4b, reproduces an area identification signal from receive radio signals from the BS 6 in the location registration area 4b, and displays on the display portion 17 the time according to the standard time of the zone in which the location registration area 4b exists.

Table 1 shows the location of said area identification signal when the base station (BS) 6 of FIG. 1 is included in a cellular mobile telephone system of Standard EIA/TIA 553 and conforms to the IS-54 (Revision A) Standard (Dual-Mode Mobile Station Compatibility Standard, published in January 1991 by the Electronic Industries Association). This area identification signal, contained in Word 1 of the system parameter overhead message in the receive radio signals from the BS 6, is in a 14-bit system identification (SID1) field.

TABLE 1

| System Parameter Overhead Message (Word 1) | |
| --- | --- |
| Information element | Length (bits) |
| T1T2 = 11 | 2 |
| DCC | 2 |
| SID1 | 14 |
| RSVD = 0 | 1 |
| AUTH | 1 |
| PCI | 1 |
| NAWC | 4 |
| OHD = 110 | 3 |
| P | 12 |

Table 2 schematically shows time difference data to be stored in the ROM 15A.

TABLE 2

| Data Stored in ROM 15A | |
| --- | --- |
| SID signal (Location registration area) | Time difference (H) |
| 4a | +1 |
| 4b | −1 |
| 4c | 0 |
| 4d | 0 |
| 4e | +1 |

If the service coverage of the mobile telephone system is to include location registration areas 4a, 4b, 4c, 4d and 4e, one of the five kinds of area identification signals respectively representing the location registration areas 4a, 4b, 4c, 4d and 4e will be contained in said SID1 field. The ROM 15A of the mobile telephone set 7A stores an area identification signal indicated by the SID1 signal, i.e. a time difference corresponding to the location registration area 4a, 4b, 4c, 4d or 4e, as time difference data. Since the area identification signal 4c is the location of the home memory of the MS 7A, the time difference corresponding to the area 4c obviously is 0 hour. The MS 7A, when it is in the area 4a, displays a time one hour later than when in the area 4c.

Figure 3:
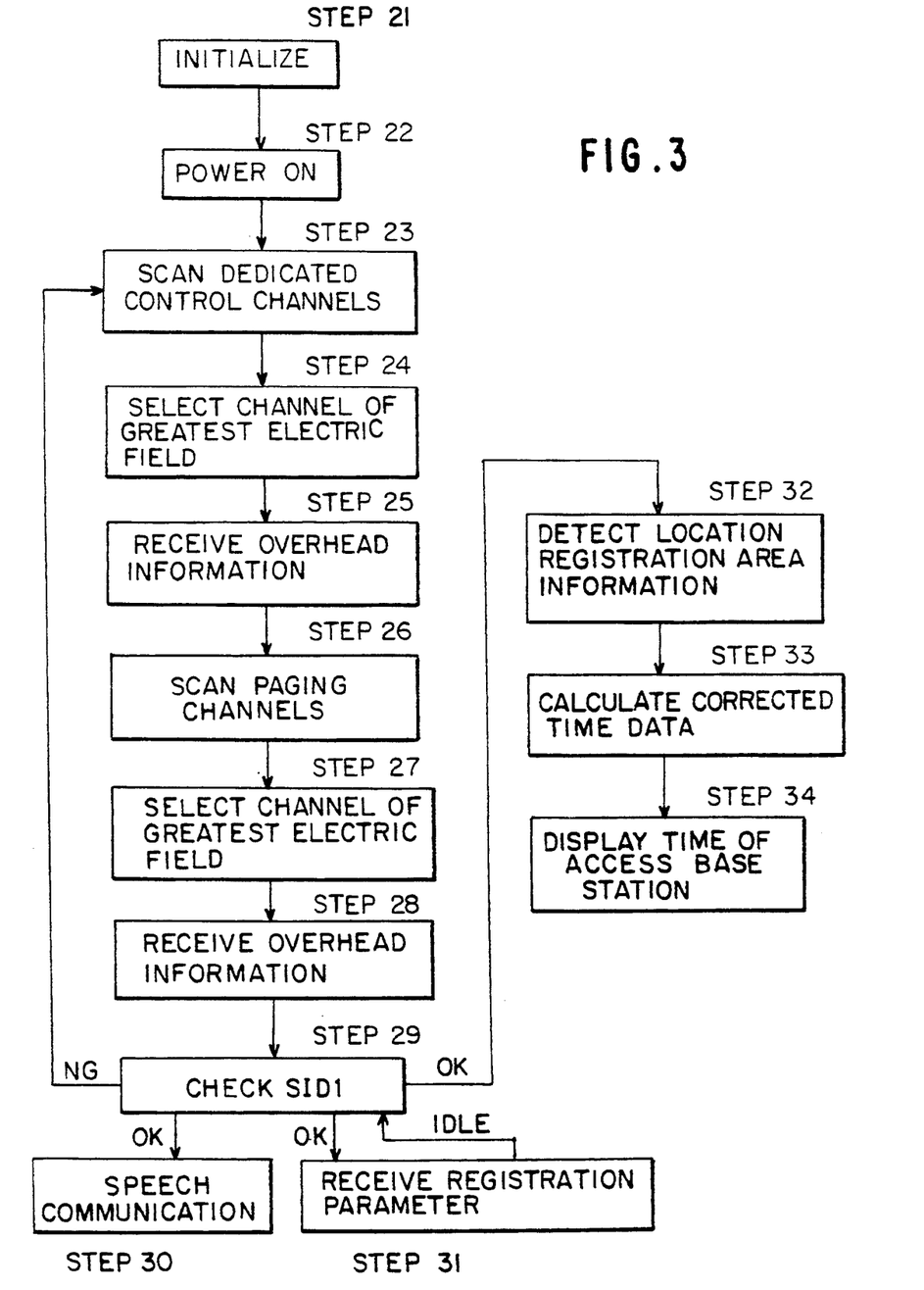
FIG. 3 is a flow chart for describing the time displaying operation in the mobile telephone set 7A shown in FIG. 2.

Further referring to FIG. 3 together, the user or the operator of the mobile telephone set 7A first initializes the clock circuit 18 so as to count time according to the standard time of the location registration area 4c (step 21). In using the MS 7A, when the user turns on the power source (not shown) of the MS 7A (step 22), the control portion 16A controls the synthesizer portion 14 so as to scan a predetermined plurality of dedicated control channels (D channels) (step 23). The receiver circuit of the radio portion 12 detects the D channel indicating the greatest receive electric field, and the control portion 16A selects the detected D channel (step 24). The control portion 16A receives over the D channel the radio signals from the BS 6 via the antenna 11, the radio portion 12 and a demodulator portion 13, reproduces the overhead information message contained in the receive radio signals to update the SID1 signal, i.e. the area identification signal, and at the same time obtains paging channel (P channel) information (step 25). The control portion 16A scans a plurality of P channels in accordance with this P channel information (step 26). The receiver circuit of the radio portion 12 detects the P channel indicating the greatest receive electric field, and the control portion 16A selects the detected P channel 10 (step 27). The MS 7A receives radio signals including an overhead information message from the BS 6 over the P channel (step 28).

The control portion 16A checks whether or not the SID1 signal in the overhead information message received over the P channel and the SID1 signal received over the D channel are identical (step 29). If they are, this MS 7A shifts to the communication mode in a speech connecting sequence well known to those skilled in the art (step 30), at the same time receives a location registration parameter to perform location registering operation (step 31), and then shifts to displayed time correcting operations to be described below (steps 32, 33 and 34). Or, if the two SID1 signals are not found identical at step 29, the MS 7A will return to step 23.

At step 32, the control portion 16A detects from the SID1 signal an area identification signal by which the location of this MS 7A can be identified from among the location registration areas 4a, 4b, 4c, 4d and 4e. The CPU 31 of the control portion 16A reads out of the ROM 15A, using the detected area identification signal as the address signal, the time difference data of the corresponding location registration area, and adds the time difference data and the time data from the clock circuit 18 to generate corrected time data (step 33). The corrected time data indicate the time resulting from the time difference data of the location registration area 4a (+1 hour) to the time according to the standard time of the home town 4c. The display portion 17, receives the corrected time data from the control portion 15A, and displays the current time according to the standard time of the location registration area to which the accessed BS 5 belongs (step 34).

As described above, since the mobile telephone set 7A automatically displays the current time according to the standard time of the area in which it is being used wherever it may be, the user of this set 7A need no effort to find out what the local standard time is, and accordingly is provided with greater convenience.

Figure 4:
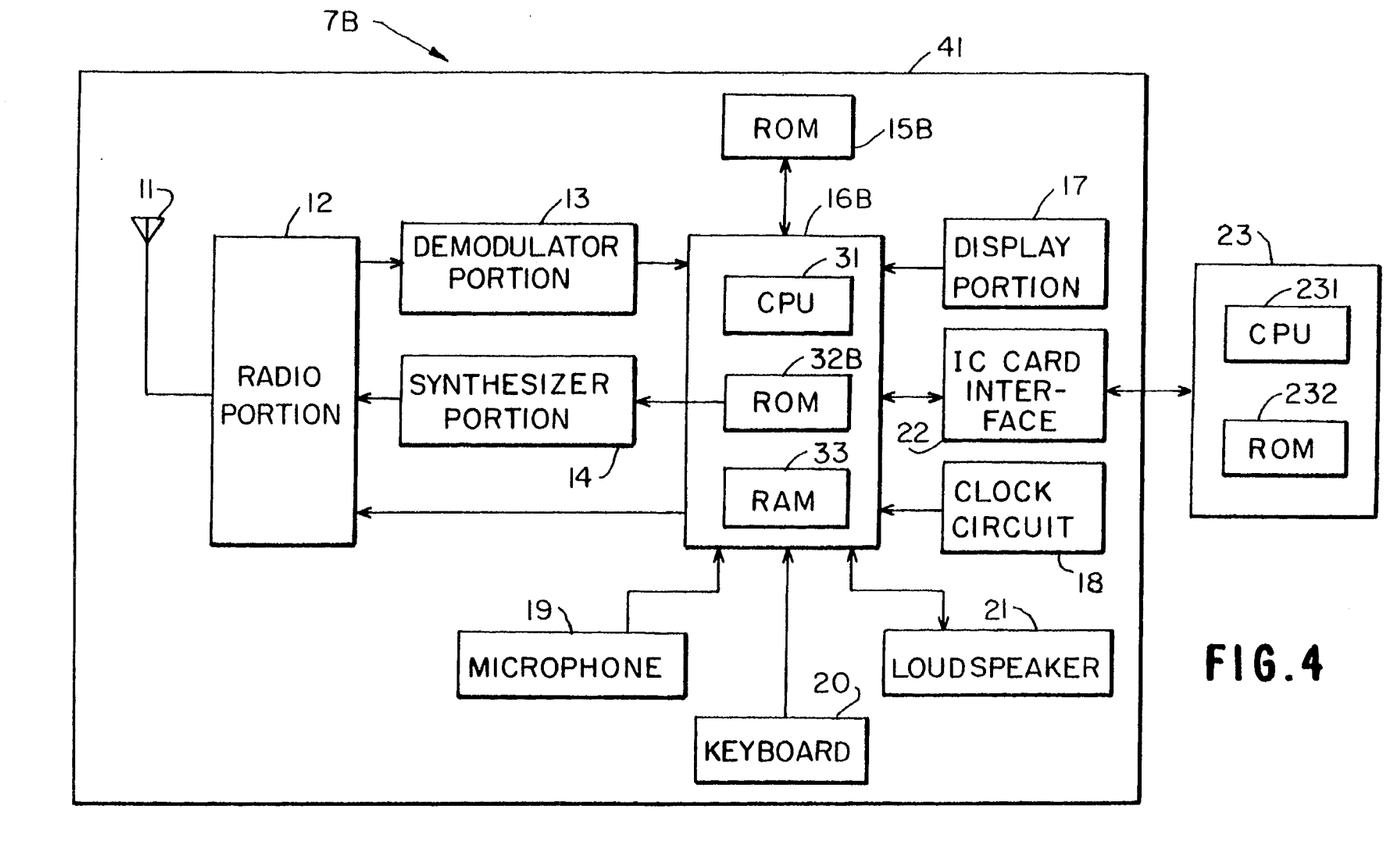
FIG. 4 is a block diagram of another preferred embodiment of the invention.

Referring to FIGS. 4 and 2 together, a mobile telephone set (MS) 7B used in the location registration area 4a has respectively the same antenna 11, radio portion 12, demodulator portion 13, frequency synthesizer portion 14, display portion 17, clock circuit 18, microphone 19, keyboard 20 and speaker 21 as what the MS 7A has. The control portion 16B and ROM 15B of this MS 7B are substantially the same circuits as the control portion 16A and ROM 15A, respectively, of the MS 7A, but the program stored in a ROM 32B built into the control portion 16B and data stored in the ROM 15B are slightly different from their respective counterparts in the MS 7A.

This MS 7B further includes an IC card 23 containing a microprocessor (CPU) 231 and a ROM 232, and an IC card interface 22 constituting an interface circuit for the IC card 23 and the control portion 16B. The MS 7B consists of the IC card 23 and the body 41 of the mobile telephone set comprising other constituent elements than the card 23, which can be inserted into any one of the bodies 41 of mobile telephone sets belonging to this mobile telephone system. The IC card 23, used for counting the charge among other purposes, stores in its ROM 232 the MS 7B user's personal identification number and the area code number representing the home town (location registration area 4c). Said personal identification number is registered with the home location memory office 3, which is the home town of the user of the IC card 23. Therefore, the user of this IC card-inserting type MS 7B has only to carry with him or her the IC card 23, and make a telephone call at his or her own charge irrespective of the choice of the MS body 41 into which the IC card 23 is inserted. The main body 41 is usually used within location registration areas of the same standard time, and the area code signal stored in the ROM 15B of this body 41 is that of the location registration area 4a.

The IC card-inserting type mobile telephone set 7B is not limited in use to mobile telephone systems, but can be used for other purposes including facsimile systems, in which case other constituent elements essential for facsimile communication would obviously be required.

One of IC cards 23 for use with the mobile telephone set 7B of FIG. 4 is further provided in its ROM 232 with a data area for displaying the time.

TABLE 3

| Data Stored in ROM's 232 and 15B | |
|---|---|
| SID signal (Location registration area) | Time difference (H) |
| 4a | −1 |
| 4b | +1 |
| 4c | 0 |
| 4d | 0 |
| 4e | −1 |

Thus, a ROM 232 of a first type, using the area code signals stored in the ROM 15B as the address signals, stores in the form of time difference data the time differences between the location registration area 4c, which is the home town of the IC card 23, and the location registration areas 4a, 4b, 4c, 4d and 4e, in any of which the mobile telephone set body 41 can be used. Since the location registration area 4c is the location of the home location memory of the IC card 23, the time difference obviously is 0 hour when the body 41 is in the area 4c. Or when the IC card is used in the area 4a as shown in FIG. 1, the time difference is −1 hour.

Figure 5:
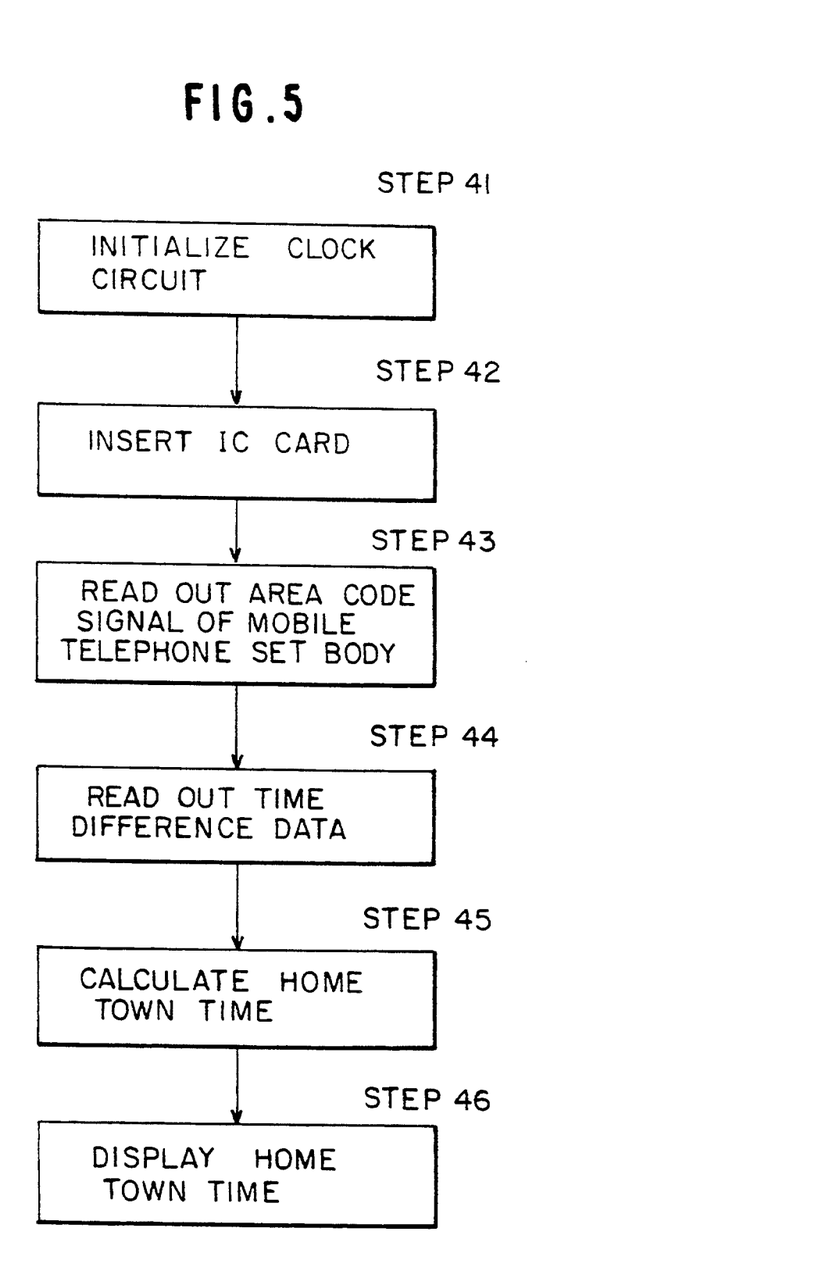
FIG. 5 is a flow chart for describing one of the time displaying operations in the mobile telephone set 7B shown in FIG. 4.

To describe the time displaying operation of the MS 7B fitted with one of the IC cards 23 with reference to FIG. 5 together, the clock circuit 18 of the mobile telephone set body 41 counts the time according to the standard time of the location registration area 4a stored in the ROM 15B (step 41). To use the MS 7B, the user inserts the IC card 23 into the body 41 (step 42). Then the control section 16B reads out the area code signal representing the location registration area 4a from the ROM 15B, and sends this area code signal to the IC card 23 via the IC card interface 22 (step 43). The CPU 231 of the IC card 23 reads out of the ROM 232 the time difference data (−1 hour) corresponding to this area code signal, and sends the time difference data to the control portion 16B via the IC card interface 22 (step 44). The control portion 16B adds the time data from the clock circuit 18 and the time difference data to generate corrected time data (step 45). The corrected time data indicate the current time according to the standard time of the location registration area 4c. The control portion 16B sends the corrected time data to the display portion 17, which displays the current time corresponding to the corrected time data (step 46).

Accordingly the display portion of the MS 7B automatically displays the home town time of the IC card 23.

Next will be described another preferred embodiment in which the mobile telephone set 7B of FIG. 4 is fitted with an IC card 23 of another type. In this embodiment, time difference data are not stored in the IC card 23, and instead time difference data of the same format as shown in Table 3 are stored in the ROM 15B in the body 41 of the mobile telephone set.

Figure 6:
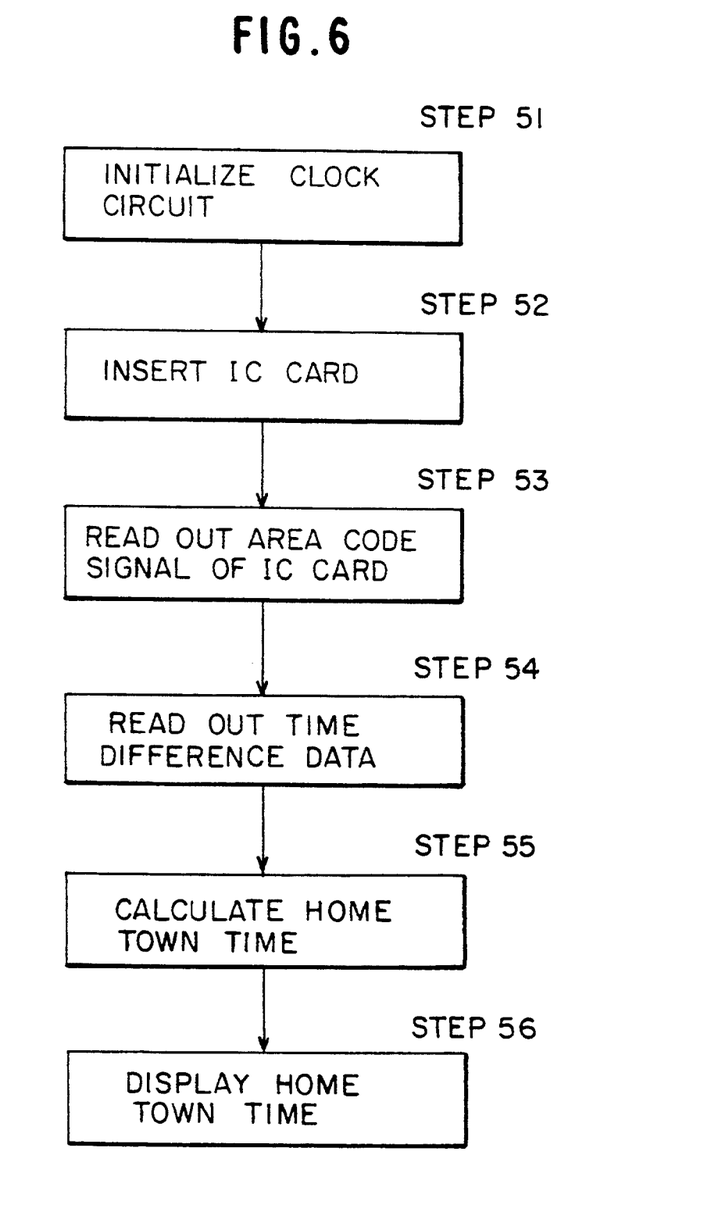

To describe the time displaying operation of the MS 4B fitted with an IC card 23 of the other type with reference to FIGS. 6 and 4 together, steps 51 and 52 are the same operations as steps 41 and 42, respectively, in FIG. 5. At step 53, the IC card 23 reads out of the ROM 232 the area code signal representing the location registration area 4c, and sends this area code signal to the control portion 16B via the IC card interface 22 (step 53). The CPU 31 of the control portion 16B reads out of the ROM 15B the time difference data corresponding to this area code signal (−1 hour) (step 54). The following steps 55 and 56, too, are the same as steps 45 and 46, respectively, in FIG. 5, and the display portion 17 of the the MS 7B automatically displays the home town time of the IC card 23.

Since the mobile telephone set 7B, as described above, automatically displays the home town time of the IC card 23 wherever it may be used, the user of this set 7B is relieved from the trouble of calculating the time difference when making a telephone call to the home town.

As hitherto described, a mobile terminal equipment according to the present invention calculates the time difference between its current location and its home town according to its own specific area code signal and separately obtained information on its current location, and automatically displays the home town time and the current time according to the standard time of the area in which it is currently located. Therefore this mobile terminal equipment has the advantage of improving the convenience of its user.

Although the invention has been described with reference to specific embodiment embodiments, this description is not meant to be construed in a limiting sense. Various modifications of the disclosed embodiment, as well as other embodiments of the invention, will become apparent to persons skilled in the art upon reference to the description of the invention. It is therefore contemplated that the appended claims will cover any such modifications or embodiments as fall within the true scope of the invention.

What is claimed is:

1. Mobile terminal equipment comprising:
locational information generating means for generating locational information indicating which of a plurality of standard time zones a given location belongs to, said locational information generating means including a ROM for storing, as said locational information, the main area of use corresponding to one of said standard time zones,
clock means for generating time data counted according to a present one of said plurality of standard time zones;
time difference calculating means for calculating a time difference between one of said standard time zones and the standard time zone of the area corresponding to said locational information, said time difference calculating means including an IC card for storing in advance time differences between the standard time zone of said main area of use and those of a plurality of areas of use, and an IC card interface means for reading out a time difference from said IC card
time data correcting means responsive to said time difference calculating means for correcting said time data to the time data of the standard time zone corresponding to said locational information; and
time display means for displaying the time corresponding to said corrected time data.

2. Mobile terminal equipment comprising:
locational information generating means for generating locational information indicating which of a plurality of standard time zones a given location belongs to, said locational information generating means including an IC card for storing a main area of use as said locational information, and IC card interface means for reading out said main area of use from said IC card;
clock means for generating time data counted according to a present one of said standard time zones;
time difference calculating means for calculating a time difference between one of said standard time zones and the standard time zone of said main area of use;
time data correcting means responsive to said time difference calculating means for correcting said time data into time data of the standard time zone corresponding to said locational information; and
time display means for displaying a time corresponding to said corrected time data.

3. A mobile terminal equipment provided with:
locational information storage means for storing in advance locational information representing an are of use;
clock means for generating time data counted according to the standard time of said area of use;
an IC card for storing in advance the time differences between the standard time of a predetermined main area of use and those of a plurality of areas of use including said area of use;
IC card interface means for reading out said time difference of the area of use corresponding to said locational information from said ID card;
time data correcting means responsive to said time difference for correcting said time data into the time data of said main area of use; and
time display means for displaying the time corresponding to said corrected time data.

4. A mobile terminal equipment provided with:
an IC card for storing locational information indicating which of a plurality of standard time zones a given location belongs to;
clock means for generating time data counted according to a predetermined one of said standard times;
time difference calculating means for reading out said locational information and calculating the time difference between one of said standard times and the standard time of the area corresponding to said locational information;
time data correcting means responsive to said time difference for correcting said time data into the time data of the standard time corresponding to said locational information; and
time display means for displaying the time corresponding to said corrected time data.

* * * * *

UNITED STATES PATENT AND TRADEMARK OFFICE
CERTIFICATE OF CORRECTION

PATENT NO. : 5,375,104
DATED : December 20, 1994
INVENTOR(S) : Ishii, et. al.

It is certified that error appears in the above-indentified patent and that said Letters Patent is hereby corrected as shown below:

Column 8, line 34, change "are" to --area--.

Signed and Sealed this

Eighteenth Day of April, 1995

Attest:

BRUCE LEHMAN

*Commissioner of Patents and Trademarks*

*Attesting Officer*